United States Patent Office 3,326,859
Patented June 20, 1967

---

3,326,859
POLYMERIZATION METHOD USING PEROXYCARBONATE CATALYST
Jerome A. Seiner, Pittsburgh, Pa., assignor to Pittsburgh Plate Glass Company, Pittsburgh, Pa., a corporation of Pennsylvania
No Drawing. Filed May 11, 1966, Ser. No. 549,145
21 Claims. (Cl. 260—72)

This application is a continuation-in-part of copending application Ser. No. 352,982, filed Mar. 18, 1964 and Ser. No. 360,430, filed Apr. 10, 1964.

This invention relates to the interpolymerization of monomer mixtures containing amides or hydroxyalkyl esters of unsaturated carboxylic acids, and more particularly, to an improved method of interpolymerizing such monomers with other ethylenically unsaturated monomers using a peroxycarbonate as a catalyst.

The outstanding properties of coating compositions containing interpolymers of unsaturated carboxylic acid amides has led to their large scale commercial acceptance. Such compositions and methods for their preparation are disclosed, for example, in United States Patents Nos. 2,870,116, 2,870,117, 2,940,945, 2,978,437, 3,038,963 and 3,079,434. These interpolymers are employed to produce clear films, or as resinous vehicles for enamels and other thermosetting compositions, and when employed in this manner provide tough, flexible, mar resistant films having excellent adhesion, chemical resistance and other properties.

Similarly, interpolymers of hydroxyalkyl esters of unsaturated acids have been employed for various coating applications; coating compositions containing such interpolymers are described in United States Patents Nos. 2,681,897 and 3,084,184. Compositions in which these interpolymers are employed along with other resinous components are advantageously utilized in automotive finishes, appliance finishes, and in similar protective and decorative coatings.

The amide or hydroxyalkyl ester interpolymers utilized in coating compositions are ordinarily produced by interpolymerizing monomer mixtures containing such amides or hydroxyalkyl esters with at least one other ethylenically unsaturated monomer in the presence of a catalyst. Heretofore, certain peroxides catalysts and azo compounds have been employed for this purpose, but these are not entirely satisfactory and give rise to certain problems.

For example, azo compounds, such as alpha, alpha'-azo-bis-isobutyronitrile, have been found to be quite effective and to give products with good properties but such catalysts cause the reaction to be quite vigorous and difficult to control, even when relatively unreactive monomers are employed. When highly reactive monomers are included in the polymerization mixture, the reaction using azo type catalysts is so difficult to control as to become impracticable on a large scale. For instance, the inclusion of acrylonitrile in the polymerization mixture, or the use of substantial amounts of alkyl acrylates causes an exothermic reaction which is extremely difficult to control. Similarly, polymerization mixtures in which relatively high levels of unsaturated amide, such as acrylamide, are present are also hard to control, with an additional problem being the difficulty with which the final product is filtered in such cases when the reaction temperature has risen above the desired level.

For such reasons, most of the large scale manufacture of amide interpolymers has been carried out with the cumene hydroperoxide of commerce as the catalyst. However, while cumene hydroperoxide and similar peroxygen type catalysts provide more controllable reactions, the process still must be carefully regulated, and with polymerization mixtures such as those above, problems of foaming, localized overheating and excessive exotherms are encountered. In addition, relatively large amounts of these catalysts are often required to achieve high conversions. With some reaction systems, such as those containing 35 percent or more of styrene, it is difficult to obtain adequate conversions without very high catalyst levels, and complete conversion cannot be attained with such catalysts using any reasonable amount.

Similar problems are encountered in the manufacture of hydroxyalkyl ester interpolymers. Azo compounds such as alpha, alpha'-azobis(isobutyronitrile) are effective and give products with good properties, but frequently cause the reaction to be quite vigorous and difficult to control. Benzoyl peroxide and similar peroxide catalysts are more satisfactory and provide more controllable reactions, but the process still must be closely controlled and problems of foaming, localized overheating and excessive exotherms are still frequently encountered. In addition, relatively large amounts of these catalysts are required to achieve adequately high conversions.

It has now been discovered that certain peroxycarbonates, when employed as the catalyst for the interpolymerization of monomer mixtures comprising hydroxyalkyl esters or unsaturated amides with other unsaturated monomers, are substantially more effective than those catalysts considered to be best heretofore and which have been long and extensively used in the large scale practice of such processes. In addition to their effectiveness, these peroxycarbonate catalysts provide easily controllable reaction and unexpectedly improve not only the properties of the resinous product of the interpolymerization, but even more surprisingly often provide marked improvement of certain properties of the cured films made from coating compositions employing these interpolymers.

The peroxycarbonates which are the catalysts of this invention correspond generally to the formula:

(I) 

where R is a tertiary alkyl radical of up to about 8 carbon atoms or an aryl substituted derivative thereof, and $R_1$ is an alkyl radical of up to about 8 carbon atoms, an aralkyl radical, or an alkoxyalkyl radical. The preferred compounds of this class are those in which R is tertiary-butyl, tertiary-amyl or alpha-cumyl, and those in which R is lower alkyl, benzyl or lower alkoxyethyl. Some specific examples of these compounds include the following:

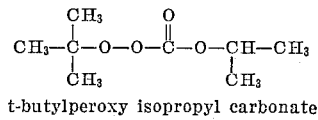

t-butylperoxy isopropyl carbonate

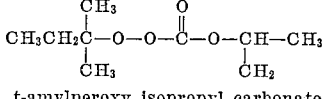

t-amylperoxy isopropyl carbonate

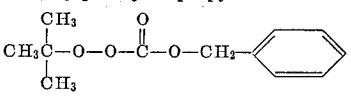

t-butylperoxy benzyl carbonate

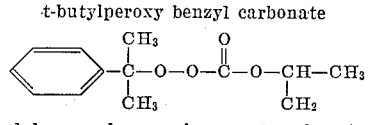

alpha-cumylperoxy isopropyl carbonate

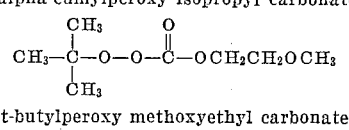

t-butylperoxy methoxyethyl carbonate

There may also be employed diesters in which two peroxy-containing radicals are present. These may be depicted by the formlulae:

(II)
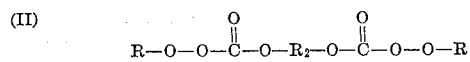

and (III)
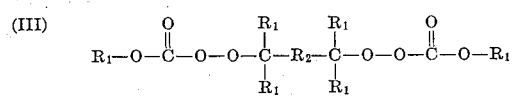

where R and $R_1$ are as above, and $R_2$ is an alkylene radical of up to about 12 carbon atoms or an oxaalkylene radical of up to about 10 carbon atoms. These may be derived, for example, from ethylene glycol, propylene glycol, diethylene glycol, triethylene glycol, 2,2-dimethylpropylene glycol, and the like.

In Formula III, $R_2$ is also an alkylene or oxaalkylene radical, but the group represented by $R_2$ is attached to the peroxygen through a tertiary carbon atom. The groups represented by $R_1$ can be the same or different. Such compounds can be derived from, for example, 1,1,5,5-tetramethylbutylene glycol; 1,1,6,6-tetramethylpentylene glycol; 1,1,5,5-tetramethyl-3-oxapentylene glycol, and similar compounds containing 2 or more tertiary carbon atoms.

Some specific examples of such compounds include:

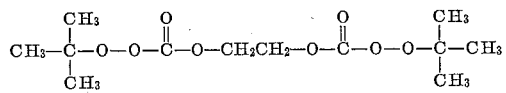

ethylene bis(t-butylperoxycarbonate)

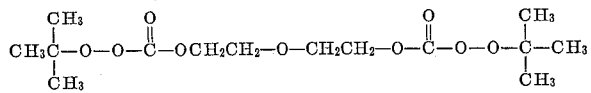

3-oxapentylene bis(t-butylperoxycarbonate)

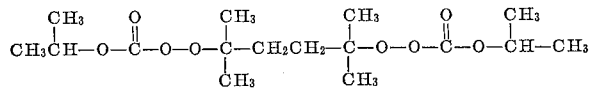

1,1,4,4-tetramethylbutylene bis(isopropoxypercarbonate)

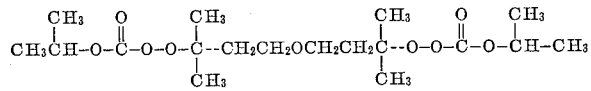

1,1,7,7-tetramethyl-4-oxaheptylene bis(isopropoxypercarbonate)

The groups designated by R, $R_1$ and $R_2$ need not be solely hydrocarbon, but may include other substituents, such as nitro groups, halogens, ether linkages, hydroxyl groups, and the like. Such materials are considered to be equivalent to the above-described compounds and can be utilized in accordance with the invention. A few examples of specific compounds are:

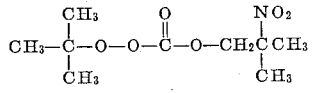

t-butylperoxy-2-nitro-2-methylpropyl carbonate

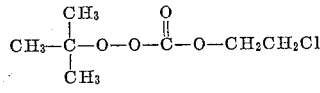

t-butylperoxy 2-chloroethyl carbonate

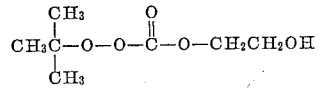

t-butylperoxy 2-hydroxyethyl carbonate

Similarly, the term "alkyl" is considered to include cycloalkyl, as in the compound:

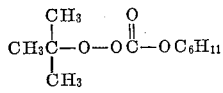

t-butylperoxy cyclohexyl carbonate

One method of producing the peroxycarbonates employed herein is by reacting an alkyl (or other) hydroperoxide with an alkyl (or other) chloroformate in the presence of an alkaline material, as disclosed in United States Patent No. 2,374,789.

Exemplifying the advantages attained by the use of these catalysts are the results obtained with tertiary-butylperoxy isopropyl carbonate. It has been found that this catalyst is at least twice as effective in interpolymerizing hydroxyalkyl esters and at least three times as effective in interpolymerizing unsaturated amides, as is alpha, alpha'-azo-bis-isobutyronitrile, which was the most effective catalyst for such polymerizations known heretofore. Further, in producing amide interpolymers this compound is about fourteen times as effective as cumene hydroperoxide, which has been almost exclusively employed heretofore in commercial production of such interpolymers, and it is four times as effective as the widely used benzoyl peroxide in producing hydroxyalkyl ester interpolymers.

In addition, this catalyst gives essentially complete conversion in relatively short reaction times, exhibits a uniform and mild exotherm during the polymerization, eliminates foaming and frothing of the reaction mixture, and provides polymers of greatly improved color with negligible catalyst residues remaining therein. Furthermore, the interpolymers obtained, when employed in place of similar interpolymers made with other catalysts in standard coating compositions, provide markedly improved film properties, such as better color after baking at high temperature and enhanced durability and weatherability.

The catalysts of this invention are advantageously utilized in the interpolymerization of any monomer mixture containing an appreciable proportion, e.g. 2 percent or more, of hydroxyalkyl ester or unsaturated amide or both. The amide interpolymers herein comprise the addition polymerization product of an unsaturated carboxylic acid amide and at least one other ethylenically unsaturated monomer. Among the amides which can be utilized are acrylamide, methacrylamide, itaconic acid diamide, alpha-ethyl acrylamide, crotonamide, maleamic acid and esters, maleuric acid and esters, and other amides of alpha, beta-ethylenically unsaturated carboxylic acids containing up to, for example, about 10 carbon atoms. An acrylamide is preferred, this term being utilized to include acrylamide, methacrylamide and similar alpha-substituted acrylic amides, and N-substituted acrylic amides, such as N-butoxymethyl acrylamide and N-butoxymethyl methacrylamide.

The monomer or monomers with which the amide is interpolymerized can be any ethylenic compound copolymerizable with the unsaturated amide, the polymerization taking place through the ethylenically unsaturated bonds. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Among the comonomers often employed are methyl methacrylate, ethyl acrylate, styrene, vinyl toluene, acrylonitrile, methacrylonitrile, acrylic acid, methacrylic acid, 2-ethyl hexyl acrylate, butyl acrylate, and butyl methacrylate. The interpolymer compositions described in the above-mentioned United States patents, for example, United States Patent No. 3,037,963, exemplify the type of amide interpolymers preferred for many purposes and to which the instant invention is applicable. The many unsaturated compounds disclosed in those patents illustrate the numerous monomers which can be interpolymerized with the amide in accordance with this invention. In many cases, the amide interpolymer is further reacted with an aldehyde to replace amido hydrogen atoms with an alkylol group. Further reaction with an alcohol produces etherification of the alkylol groups. Such modified interpolymers are often preferred and are characterized by having amido hydrogen atoms replaced by the structure:

where $R_2$ is hydrogen or an alkyl radical, dependent upon the nature of the aldehyde employed, and $R_3$ is hydrogen or an alkyl or other organic radical, depending upon whether etherification of the alkylol groups is carried out and if so, the nature of the etherifying alcohol. Generally, one hydrogen atom per amido group is replaced, but it is possible to replace both.

Alternatively, these modified interpolymers can be produced by interpolymerizing an aldehyde-modified unsaturated amide, such as an N-alkylol amide, which may be then etherified, if desired, or by employing an N-alkoxyalkyl amide. Such polymerizations are also effectively catalyzed by the herein-described peroxycarbonates.

In order to prevent possible problems of storage stability and premature gelation, and to obtain optimum resin and film properties, it is desirable that at least part, and in many cases at least about half, of the alkylol groups of the aldehyde-modified amide interpolymer be etherified, so that all or part, and preferably at least about 50 percent, of the amido groups have a hydrogen atom replaced by an alkoxyalkyl group. The aldehyde-modification is preferably carried out with formaldehyde or with a formaldehyde-releasing agent, such as paraformaldehyde, although other aldehydes, such as acetaldehyde, butyraldehyde, and the like, can be used. Butanol is a preferred alcohol for use in the etherification, although other monohydric alcohols, such as methanol, ethanol, propanol, hexanol, and other alkanols containing up to about 20 carbon atoms, may also be employed; as may aromatic alcohols, such as benzyl alcohol; cyclic alcohols, such as cyclohexanol; the monoethers of glycols, such as butyl Cellosolve (ethylene glycol monobutyl ether), butyl Carbitol (diethylene glycol monobutyl ether) and other Cellosolves and Carbitols; or substituted alcohols, such as 3-chloropropanol.

The aldehyde-modifying and etherifying reaction is generally carried out by reacting the amide interpolymer with the aldehyde and alcohol, often in the presence of a mild acid catalyst, such as maleic anhydride, while removing the water of condensation. The above-mentioned patents describe this modifying reaction in further detail.

Because of the outstanding properties of the aldehyde-modified and etherified amide interpolymers, the improved process for the interpolymerization reaction as described herein is uniquely valuable when the polymerization reaction is part of the preparation of such interpolymers. However, it will be understood that the process using these new catalysts can be utilized whether or not the resultant interpolymer is to be modified with an aldehyde and an alcohol.

While the advantages of the instant invention are generally applicable to the preparation of amide interpolymers of the class described using any of the various monomers mentioned, it has been found that these catalysts provide even greater advantages by solving certain problems encountered with several specific monomer systems. Thus, for example, the use of acrylonitrile as a comonomer with the unsaturated amide, even in quantities as low as 3 percent by weight or even lower, results in an extremely difficult to control reaction. Methacrylonitrile gives similar problems. The present catalysts, however, provide easily controlled polymerization of such systems without the difficulties normally encountered. The typical monomer system of this type, with which the catalysts herein are especially useful, contains from about 2 percent to about 25 percent of an acrylamide, from about 3 percent to about 30 percent of acrylonitrile or methacrylonitrile, and at least one other monomer.

Another reaction system in which problems including excessive foaming and difficult control have been encountered, involves the use of substantial amounts of alkyl acrylates along with the unsaturated amide. In this case also, the present catalysts provide easily controlled reaction and overcome the difficulties normally associated with the polymerization of such mixtures. These particular advantages are attained particularly in those systems wherein there are present from about 2 percent to about 25 percent of an acrylamide and at least about 35 percent of an alkyl acrylate, such as ethyl acrylate, butyl acrylate, 2-ethyl hexyl acrylate, and other alkyl acrylates having up to about 12 carbon atoms in the alkyl group, along with sufficient other monomer or monomers to make 100 percent, i.e., up to about 63 percent.

As exemplified by those systems mentioned above, the catalysts of this invention are especially valuable when employed in the polymerization of monomer systems in which high and often violent exotherms tend to occur, and which thus are difficult and dangerous to control. These catalysts are also particularly effective in providing high conversions in certain systems wherein it is very difficult to attain substantially complete reaction using the conventional catalysts employed heretofore. Important among this type of monomer system are those in which a high proportion of styrene, about 35 percent or higher, is employed. In systems wherein from about 2 percent to about 25 percent of an acrylamide is interpolymerized with at least about 35 percent styrene and sufficient other monomers to make 100 percent, the use of the catalysts of the instant invention results in essentially complete reaction. Catalysts such as the peroxygen and azo compounds mentioned above do not provide substantially complete conversion in these systems, even when much larger quantities of catalyst are employed than is the case with the catalysts of this invention.

The other class of polymerizations to which the catalysts herein are applicable are those in which the monomer mixture comprises a hydroxyalkyl ester. In these, any polymerizable hydroxyalkyl ester of an ethylenically unsaturated carboxylic acid can be employed. Preferred polymerizations are those containing hydroxyalkyl esters in which the alkyl group has up to about 12 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or di-esters of unsaturated dicarboxylic acids, such as maleic acid, fumaric acid and itaconic acid, in which at least one of the esterifying groups is hydroxyalkyl. Such esters include bis(hydroxyethyl)maleate, bis(hydroxypropyl)fumarate, and similar bis(hydroxyalkyl) esters, as well as mixed alkyl hydroxyalkyl esters, such as butyl hydroxyethyl maleate and benzyl hydroxypropyl maleate. Monoesters such as mono(hydroxyethyl) and mono(hydroxypropyl) esters of maleic acid and similar acids can also be used.

The monomer or monomers with which the hydroxyalkyl ester is interpolymerized can be an ethylenic compound copolymerizable with the ester, including monoolefinic and diolefinic hydrocarbons, unsaturated esters of organic and inorganic acids, esters of unsaturated acids, nitriles, unsaturated acids, and the like. Examples of such monomers include styrene, 1,3-butadiene, 2-chlorobutene, alpha-methyl styrene, alpha-chlorostyrene, 2-chloro-1,3-butadiene, 1,1-dichloroethylene, vinyl butyrate, vinyl acetate, allyl chloride, dimethyl maleate, divinyl benzene, diallyl itaconate, triallyl cyanurate, and the like.

Among the most useful interpolymers are those produced from the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylates, as well as similar esters having up to about 20 carbon atoms in the alkyl group. Among the vinyl aromatic hydrocarbons generally utilized are styrene and alpha-alkyl styrene or vinyl toluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyl toluene, acrylonitrile, methacrylonitrile, methacrylic acid, acrylic acid, 2-ethyl hexyl acrylate, butyl acrylate, butyl methacrylate, and lauryl methacrylate.

As is the case with the amide polymerizations described above, the instant invention is particularly advantageous with monomer systems in which the hydroxylalkyl ester is interpolymerized with monomers which tend to produce high and sometimes violent exotherms and which are thus difficult and dangerous to control. These include monomer mixtures having high levels, e.g. 50 percent or more, of an alkyl acrylate and those containing even small proportions of acrylonitrile. With such monomer systems, the peroxycarbonate catalysts provide an easily controlled reaction without the difficulties which are encountered with conventional catalyst systems. These catalysts are also advantageous in providing high conversions and essentially complete reaction with monomer systems containing high proportions of styrene, using considerably lower quantities of catalyst than is the normal practice with the catalysts employed heretofore.

The above polymerization reactions can be carried out by admixing the monomers, including the unsaturated amide or the hydroxyalkyl ester (or both) along with the other monomer or monomers, and the catalyst in a solvent, and refluxing the resulting solution for a time sufficient to obtain the desired conversion. A chain-modifying agent such as a mercaptan is often included in the polymerization mixture. Using the improved catalysts of this invention, the polymerization reaction is ordinarily complete in 8 hours or even less. It has been found that the temperature of operation is highly important to the efficiency of the catalyst herein. In order to obtain the improved processing and other advantages described above, the temperature of the reaction mixture should be at least about 200° F. during the major part of the polymerization. Above this, any convenient temperature can be employed. The preferred temperature range is between about 200° F. and about 300° F.

The effectiveness and efficiency of these catalysts far surpass that to be expected in view of their known properties. For example, the decomposition rate curve for tertiary-butylperoxy isopropyl carbonate indicates that this compound has a half-life (50 percent decomposition) of 8 hours at 212° F. It has been found, however, that this catalyst is completely utilized, in the processes described herein, in from 3 to 8 hours.

Because of this effectiveness, very low levels of these catalysts can be employed. Thus, from about 0.02 percent to about 3 percent by weight, based on the weight of the monomers in the polymerization mixture can be used with beneficial results, with from about 0.02 percent to about 2 percent being ordinarily employed for interpolymerizations of unsaturated amides, and from about 0.05 percent to about 3 percent being generally utilized in the production of hydroxyalkyl ester interpolymers. The preferred ranges are from about 0.1 percent to about 0.5 percent of catalyst in the case of amide-containing monomer mixtures, and from about 0.2 percent to about 0.6 percent in hydroxyalkyl ester interpolymerizations. These ranges are substantially lower than the amount of other catalysts necessary to obtain comparable conversions.

It has been further found that the peroxycarbonates need not be completely pure in order to attain the desired advantages. For example, in the case of tertiary-butylperoxy isopropyl carbonate, which is a preferred catalyst of the class described, mixtures containing 10 percent to 20 percent or more of other materials, such as di(tertiary-butyl)peroxide and tertiary-butyl hydroperoxide, can be utilized and provide the advantageous results described herein. Similarly, combinations of the present catalysts with other peroxides, as well as with other types of catalysts such as azo(bis-isobutyronitrile) and other azo compounds, can be employed if desired, with attendant lowering of the amount of peroxycarbonate required.

Presumably, some of the advantages resulting from the use of these catalysts are at least in part due to the particular type of groups which terminates the polymer chains when these catalysts are utilized. The exact nature of these end groups and the manner in which they terminate the chains is not known with certainty, and thus the exact composition of the products which are achieved and which give the improved properties cannot be set forth. However, these properties are especially valuable in coatings produced from the interpolymers manufactured in this manner, and in many instances provide uses which were not heretofore available with these products. They are especially found with aldehyde-modified and etherified amide interpolymers as described above.

Except for the peroxycarbonate catalyst and a shorter reaction time, the production of interpolymers in accordance with this invention is carried out in the manner well known in the art. In a typical procedure, the reactive monomers and solvent are charged into a reaction vessel along with all or part of the catalyst and sometimes a small amount (0.5 percent to 3 percent, based on the weight of monomers) of a chain-modifying agent, such as tertiary-dodecyl mercaptan. This mixture is heated, usually to reflux, although in some cases the temperature during the major part of the polymerization reaction is held somewhat below reflux. In many cases, only a portion of the catalyst is added initially, and small portions of additional catalyst are added during the polymerization, usually after 1½ hours, after 3 hours and after six hours. The polymerization reaction is usually substantially completed within 6 to 8 hours.

If in making an amide interpolymer it is to be modified as described above, the aldehyde and alcohol are usually added after about six hours, along with, in many cases, maleic anhydride or a similar mild acid catalyst and additional solvent. The mixture is then refluxed for about 3 hours while azeotropically removing the evolved water. If desired, the further reaction can be carried out with aldehyde alone. Also, the aldehyde or the aldehyde and alcohol can be added earlier during the polymerization (even with the initial charge) or the interpolymer can be used without such modification, or the modifying reaction can be carried out later as a separate step.

Set forth below are several examples of the method of producing interpolymers with the catalysts of this invention. These examples are given to illustrate the invention and are not to construed as limitations thereon. All parts and percentages in the examples and throughout this specification are by weight unless otherwise specified.

The pertinent data for the preparation of a number of amide interpolymers made using a preferred peroxycarbonate catalyst are set forth in Table I. The catalyst employed was tertiary-butylperoxy isopropyl carbonate and the procedure followed in each case was substantially that described above. The solvent designated as Solvesso 150 is a high-boiling aromatic naphtha, and the Formcel employed is butyl Formcel, which is a solution of about 40 percent formaldehyde by weight in butanol.

TABLE I

| Ex. | Monomers (parts by weight) | | | | | | | Solvent (parts by weight) | | | Total Catalyst [1] | Temp.[2] (° F.) | Formcel (parts by weight) |
|---|---|---|---|---|---|---|---|---|---|---|---|---|---|
| | Acrylamide | Styrene | Ethyl Acrylate | Methacrylic Acid | Acrylonitrile | Methyl Methacrylate | 2-Ethyl Hexyl Acrylate | Butanol | Xylene | Solvesso 150 | | | |
| 1 | 75  | 412.5   | 975     | 37.5 |       |     |     | 375    |     | 375 | 0.22 | 232–242 | 159 |
| 2 | 75  | 187.5   | 1,200   | 37.5 |       |     |     | 375    |     | 375 | 0.22 | 230–264 | 159 |
| 3 | 150 | 375     | 660     | 37.5 | 277.5 |     |     | 375    | 375 |     | 0.44 | 210–216 | 318 |
| 4 | 75  |         | 1,087.5 | 37.5 | 300   |     |     | 375    | 375 |     | 0.41 | 206–216 | 159 |
| 5 | 75  |         | 1,387.5 | 37.5 |       |     |     | 375    |     | 375 | 0.59 | 210–250 | 159 |
| 6 | 150 | 577.5   |         | 37.5 |       | 435 | 300 | ³ 375  | 375 |     | 0.38 | 208–230 | 159 |
| 7 | 150 | 375     | 975     |      |       |     |     | 1,500  |     |     | 0.29 | 226–238 | 318 |
| 8 | 225 | 1,237.5 |         | 37.5 |       |     |     | 750    |     |     | 0.53 | 208–210 | 477 |

[1] Percent by weight, based on monomers.
[2] Range during major part of polymerization reaction.
[3] Isobutanol.

In each of the interpolymerization reactions exemplified above, the process proceeded easily and without difficulty to provide amide interpolymer products of good properties with high conversions of monomers to polymer, as shown by the non-volatile resin solids content of the polymerization mixture at the end of the reaction.

In other tests similar to the foregoing examples, various catalysts as described above were evaluated and found to be comparable. For instance, it was found that substitution of tertiary-butylperoxy benzyl carbonate and ethylene bis(tertiary-butylperoxycarboxylate) for the tertiary-butylperoxy isopropyl carbonate of Example 1 each provided essentially similar results. Using the same catalyst level and reaction conditions, these catalysts were slightly inferior to the tertiary-butylperoxy isopropyl carbonate, but were highly advantageous compared to conventional catalysts. Similar results are achieved by utilizing the above catalysts and others, such as 1,1,4,4-tetramethylbutylene bis(isopropoxypercarbonate) and alpha-cumylpropylperoxy isopropyl carbonate, with the various monomer systems of the above examples, as well as with other polymerizable mixtures of the class described. In some cases, higher or lower temperatures may be desirable, depending upon the chain length of the various substituent groups on the catalyst.

As will be noted, very low levels of catalyst were employed in the above examples, yet in all cases essentially completed conversion of monomers was attained. The reactions were all smooth and easily controlled, with no foaming, and there was either no noticeable exotherm or a very uniform and mild exotherm. The color of the product in each case was excellent.

The above examples also illustrate the manner in which the instant invention overcomes a number of troublesome problems in the production of amide interpolymers. Thus, Examples 2 and 5 employ monomer compositions having 80 percent and 92.5 percent ethyl acrylate, respectively; with cumene hydroperoxide as the catalyst, these compositions invariably result in a large exotherm with excessive foaming, and this problem is accentuated using azo catalysts. Similar but even more troublesome monomer compositions are shown in Examples 3 and 4, which include acrylonitrile, as well as ethyl acrylate, among the monomers. Example 4 represents a combination of the most reactive monomers employed in making amide interpolymers, and reactions of this type with conventional catalysts, particularly azo-bis(isobutyronitrile), are often dangerous and react with almost explosive violence.

Even though the peroxycarbonate catalysts solve problems arising from excessive reaction rates, as in the systems discussed above, surprisingly, they also achieve more complete reaction with systems which ordinarily do not provide high conversions. This is illustrated particularly by Example 8, in which the monomers comprise over 82 percent styrene. Essentially 100 percent conversion was achieved with 0.53 percent catalyst, while similar reactions with 1½ percent azo-bis(isobutyronitrile) give a maximum of 98 percent conversion, and as much as 4 percent cumene hydroperoxide produces only 90 percent conversion.

Another advantage of the herein-described catalysts is shown by Examples 1 and 2, in which the particular monomer and solvent composition conventionally result in products of pronounced color. Thus, such compositions with ordinary catalysts produce resins which, at 50 percent solids content, have a Gardner color of 4 to 5 (Gardner 1933 Standards), while those in the above examples have a Gardner color of 1.

In addition to the above processing and resin advantages, coating compositions formulated from the above interpolymers have all the outstanding properties for which this class of coatings is noted. These include excellent fabrication properties, hardness, chemical resistance and the like. In addition, these compostions exhibit improvement in certain properties which are important in particular uses, such as initial color, color on over-bake, anti-blocking properties, and durability.

For example, in one series of tests, a composition in which the interpolymer of Example 1 was employed as the vehicle was evaluated for properties important for coatings to be applied to cans and the like. Also evaluated were similar compositions in which the vehicles were interpolymers of the same type and monomer composition as Example 1, but prepared using cumene hydroperoxide and azo-bis(isobutyronitrile) as the catalysts. The coatings were made with a 1 to 1 ratio of titanium dioxide pigment to resin solids and applied to the ordinary electrolytic tin plate of commerce. The panels were then baked for 10 minutes at 400° F. The results are shown in Table II.

TABLE II

| Test | Example 1 | Cumene Hydroperoxide | Azo-bis-isobutyronitrile |
|---|---|---|---|
| Initial color | Good | Fair | Good. |
| Color on over-bake [1] | Very good | Poor | Do. |
| Can-end fabrication [2] | Good | Good | Do. |
| Anti-blocking [3] | do | Poor | Fair. |

[1] Discoloration after additional baking for 10 minutes at 400° F.
[2] No. 202 can-end punched from coated panel and coating inspected for fractures.
[3] Coated panels pressed together under 100 p.s.i. at 135° F. and degree of sticking noted.

In other illustrative series of tests, coating compositions made similarly to those above were evaluated for properties important in coatings for structural and decorative use. For example, Table III compares coatings on aluminum made from compositions containing the interpolymer of Example 3 and the same interpolymer made with the commercially employed cumene hydroperoxide.

TABLE III

|  | Example 3 | Cumene Hydroperoxide |
|---|---|---|
| Initial color | Fair | Poor. |
| Color on over-bake | Good | Very poor. |
| Flexibility [1] | do | Good. |
| Impact resistance [2] | do | Do. |
| Pencil hardness | 2H | 2H. |

[1] 180 degree cleat bend.
[2] Gardner Variable Impact Tester.

Comparable results are attained when various other monomers are substituted for those employed in the interpolymers of the above examples, as described herein. For instance, methacrylamide can be used in place of acrylamide, and other compounds having a polymerizable ethylenic group can be substituted for all or part of the other monomers. As disclosed in the art, the specific properties of the amide interpolymers and coatings made therefrom can be controlled to a large extent by the proper choice of monomers. The catalysts of this invention are applicable to all these monomer systems and provide distinct advantages in their production.

The following examples illustrate the invention in those embodiments in which a hydroxyalkyl ester is interpolymerized as described above.

EXAMPLE 9

A reaction vessel was charged with 529 parts of xylene and 60 parts of butanol, and heated to reflux. Over a 3-hour period, there was added a mixture of the following:

| | Parts by weight |
|---|---|
| Styrene | 662 |
| Methyl methacrylate | 414 |
| Butyl acrylate | 414 |
| Hydroxypropyl methacrylate (In a mixture containing approximately 40 percent hydroxypropyl methacrylate, 6 percent methacrylic acid and 54 percent xylene) | 66 |
| Methacrylic acid | 31 |
| Hydroxyethyl methacrylate | 65 |
| Tertiary-dodecyl mercaptan | 16.5 |
| Tertiary-butylperoxy isopropyl carbonate | 4.3 |
| Xylene | 330 |

After the addition was complete, there was added over a period of 15 minutes 0.8 part of tertiarybutylperoxy isopropyl carbonate and 66 parts of xylene. The mixture was then refluxed for a total of 6 hours with similar additions being made at the second and fourth hours. At the end of the reaction period, 268 parts of xylene were added, whereupon the product had a solids content of 48.5 percent and a Gardner-Holdt viscosity of U.

EXAMPLE 10

Example 9 was repeated, except that in place of the monomer system there specified, there were used the following:

| | Parts by weight |
|---|---|
| Styrene | 1158 |
| Butyl acrylate | 331 |
| Hydroxypropyl methacrylate | 66 |
| Methacrylic acid | 31 |
| Hydroxyethyl methacrylate | 65 |

The total catalyst concentration was 0.45 percent.

EXAMPLE 11

Example 9 was repeated, except that no mercaptan was employed and the following monomers were polymerized:

| | Parts by weight |
|---|---|
| Styrene | 993 |
| Butyl acrylate | 331 |
| Methyl methacrylate | 165 |
| Hydroxypropyl methacrylate | 66 |
| Methacrylic acid | 31 |
| Hydroxyethyl methacrylate | 65 |

The total catalyst concentration was 0.40 percent.

EXAMPLE 12

Example 9 was repeated, using the monomers set forth below, a 0.40 percent concentration of catalyst and 0.5 percent of tertiary-dodecyl mercaptan.

| | Parts by weight |
|---|---|
| Styrene | 1489 |
| Hydroxypropyl methacrylate | 66 |
| Hydroxyethyl methacrylate | 65 |
| Methacrylic acid | 31 |

EXAMPLE 13

A reaction vessel was charged with 734 parts of xylene and 190 parts of butanol, and heated to reflux. A mixture of the following monomers was then added over a 5-hour period, along with a mixture of 5 parts of tertiary-butylperoxy isopropyl carbonate and 400 parts of xylene.

| | Parts by weight |
|---|---|
| Methyl methacrylate | 636 |
| Ethyl acrylate | 456 |
| Butyl methacrylate | 695 |
| Ethylene glycol monoester of maleic acid | 200 |
| Tertiary-dodecyl mercaptan | 15 |

At the end of the addition, there was added over a period of 15 minutes 1 part of tertiary-butylperoxy isopropyl carbonate in 80 parts of xylene. Refluxing was continued for a total of 6 additional hours with similar catalyst additions being made after the second and fourth hours. At the end of the reaction period, 320 parts of xylene were added. The reaction mixture, after cooling, had a solids content of 49.5 percent and a Gardner-Holdt viscosity of R.

EXAMPLE 14

Example 13 was repeated, except that in place of the ethylene glycol monoester there employed, there were used 200 parts of the triethylene glycol monoester of maleic acid. The solids content of the product was 49.8 percent and it had a Gardner-Holdt viscosity of T.

EXAMPLE 15

Example 13 was repeated, using in place of the ethylene glycol monoester, 200 parts of the dipropylene glycol monoester of maleic acid. The solids content of the product was 48.1 percent and it had a Gardner-Holdt viscosity of Q.

EXAMPLE 16

Using the procedure of Example 13 above, a mixture of the monomers set forth below was polymerized in the presence of a total of 0.40 percent, based on the monomers, of tertiary-butylperoxy benzyl carbonate.

| | Parts by weight |
|---|---|
| Methyl methacrylate | 318 |
| Ethyl acrylate | 228 |
| Hydroxypropyl methacrylate | 40 |
| Hydroxyethyl methacrylate | 40 |
| Methacrylic acid | 20 |

As in the case of the amide interpolymerizations described, very low levels of catalyst were employed in the above hydroxyalkyl ester examples, yet in all cases, substantially complete conversion of monomers was obtained in relatively short reaction periods. The reactions were all smooth and easily controlled with no foaming and no troublesome exotherms. The color of the product in each case was excellent.

Various other catalysts of the class described may also be substituted in these examples with comparable results. For example, there may be substituted for the tertiary-butylperoxy benzyl carbonate of Example 16 catalysts such as ethylene bis(tertiary-butylperoxycarbonate), 1,1,4,4-tetramethylbutylenebis(isopropoxypercarbonate), and alpha-cumylperoxy isopropyl carbonate, and essentially similar results are attained. At the same catalyst level and reaction conditions, these catalysts are slightly inferior to the preferred tertiary-butylperoxy isopropyl carbonate, but are highly advantageous compared to conventional catalysts. As mentioned above, the optimum temperature depends upon the chain length of the various substituent groups on the catalyst.

Similarly, other hydroxyalkyl ester-containing monomer systems as described above are effectively catalyzed by the foregoing catalysts using the procedures exemplified. These may include ordinarily difficult to handle monomers, such as acrylonitrile, and the polymerizations proceed in an easily controllable manner without difficulty.

In addition to the processing advantages mentioned above, the hydroxyalkyl ester interpolymer produced and the coating compositions formulated therefrom have the excellent properties, including good gloss, adhesion and the like, for which coatings made from compositions containing hydroxyalkyl ester interpolymers are noted. In addition, compositions produced from interpolymers made with the catalysts described herein exhibit improvement in certain properties which are important in particular uses, such as initial color, color on oven-bake, and durability. The interpolymers produced herein are used in the conventional manner and can be pigmented and formulated with the usual pigments, fillers and additives. They are applied to a substrate, generally a metal such as steel or aluminum, and then baked at temperatures usually ranging from about 150° F. to about 300° F. for about 10 to about 45 minutes.

According to the provisions of the patent statutes, there are described above the invention and what are now considered to be its best embodiments. However, within the scope of the appended claims, it is to be understood that the invention can be practiced otherwise than as specifically described.

I claim:
1. In the method of interpolymerizing a mixture of monomers comprising
    (a) at least about 2 percent by weight of an unsaturated carboxylic acid amide or a hydroxyalkyl ester of an ethylenically unsaturated carboxylic acid, and
    (b) at least one other monomer coplymerizable therewith; the improvement which comprises carrying out the interpolymerization reaction at a temperature of at least about 200° F. in the presence of from about 0.02 percent to about 3 percent by weight, based upon the total monomers, of a compound having a formula selected from the group consisting of:

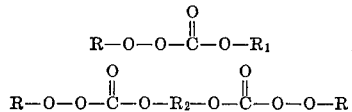

and

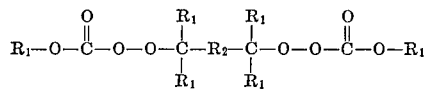

where R is selected from the group consisting of tertiary-alkyl radicals of up to about 8 carbon atoms and aryl substituted derivatives thereof; $R_1$ is selected from the group consisting of alkyl radicals of up to about 8 carbon atoms, aryl radicals, aralkyl radicals and alkoxyalkyl radicals; and $R_2$ is selected from the group consisting of alkylene radicals of up to about 12 carbon atoms and oxaalkylene radicals of up to about 10 carbon atoms.

2. The improvement of claim 1 in which said compound has the formula:

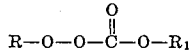

where R is a tertiary-alkyl radical of up to about 8 carbon atoms and $R_1$ is an alkyl radical of up to about 3 carbon atoms.

3. The improvement of claim 2 in which said compound is tertiary-butylperoxy isopropyl carbonate.

4. The improvement of claim 1 in which said compound has the formula:

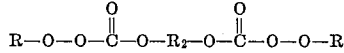

where R is a tertiary-alkyl radical of up to about 8 carbon atoms and $R_2$ is an alkylene radical of up to about 12 carbon atoms.

5. The improvement of claim 4 in which said compound is ethylene bis(tertiary-butylperoxycarbonate).

6. The improvement of claim 1 in which said compound has the formula:

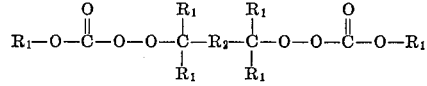

where $R_1$ is an alkyl radical of up to about 8 carbon atoms and $R_2$ is an alkylene radical of up to about 12 carbon atoms.

7. The improvement of claim 6 in which said compound is 1,1,4,4-tetramethylbutylene bis(isopropoxypercarbonate).

8. In the method of producing an amide interpolymer which comprises interpolymerizing a mixture of monomers comprising from about 2 percent to about 25 percent by weight of an ethylenically unsaturated carboxylic acid amide and at least one other ethylenically unsaturated monomer copolymerizable therewith, the improvement which comprises carrying out the interpolymerization reaction at a temperature of at least about 200° F. in the presence of from about 0.02 percent to about 2 percent by weight, based upon the total monomers, of a compound having a formula selected from the group consisting of:

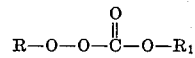

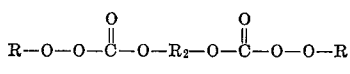

and

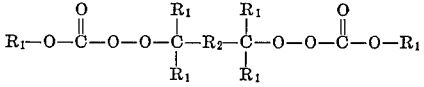

where R is selected from the group consisting of tertiary-alkyl radicals of up to about 8 carbon atoms and aryl substituted derivatives thereof; $R_1$ is selected from the group consisting of alkyl radicals of up to about 8 carbon atoms, aryl radicals, aralkyl radicals and alkoxyalkyl radicals; and $R_2$ is selected from the group consisting of alkylene radicals of up to about 12 carbon atoms and oxaalkylene radicals of up to about 10 carbon atoms.

9. The improved of claim 8 in which the amount of said compound is from about 0.1 percent to about 0.5 percent by weight based upon the total monomers.

10. The improvement of claim 8 in which said mixture of monomers comprises from about 2 percent to about 25 percent by weight of an acrylamide, from about 3 percent to about 30 percent by weight of acrylonitrile or methacrylonitrile, and at least one other ethylenically unsaturated monomer.

11. The improvement of claim 8 in which said mixture of monomers comprises from about 2 percent to about 25 percent by weight of an acrylamide and at least about 35 percent by weight of an alkyl acrylate.

12. The improvement of claim 8 in which said mixture of monomers comprises from about 2 percent to about 25 percent by weight of an acrylamide and at least about 35 percent by weight of styrene.

13. A method of producing an aldehyde-modified, etherified amide interpolymer which comprises interpolymerizing a mixture of monomers comprising from about 2 percent to about 25 percent by weight of an ethylenically unsaturated carboxylic acid amide and at least one other ethylenically unsaturated monomer copolymerizable therewith, and reacting the amido groups of the resulting interpolymer with a lower aldehyde and a monohydric alcohol, said interpolymerization being carried out at a temperature of at least about 200° F. and in the presence of from about 0.02 percent to about 2 percent by weight based upon the total monomers of a compound having a formula selected from the group consisting of:

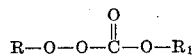

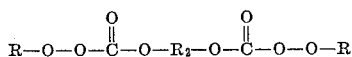

and

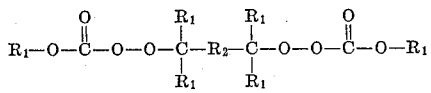

where R is selected from the group consisting of tertiary-alkyl radicals of up to about 8 carbon atoms and aryl substituted derivatives thereof; $R_1$ is selected from the group consisting of alkyl radicals of up to about 8 carbon atoms, aryl radicals, aralkyl radicals and alkoxyalkyl radicals; and $R_2$ is selected from the group consisting of alkylene radicals of up to about 12 carbon atoms, and oxaalkylene radicals of up to about 10 carbon atoms.

14. The method of claim 13 in which at least about 50 percent of said amido groups are reacted with said aldehyde and said alcohol.

15. In the interpolymerization method which comprises interpolymerizing a mixture of monomers comprising at least 2 percent by weight of a hydroxyalkyl ester of an ethylenically unsaturated carboxylic acid and at least one other ethylenically unsaturated monomer copolymerizable therewith, the improvement which comprises carrying out the interpolymerization reaction at a temperature of at least about 200° F. in the presence of from about 0.05 percent to about 3 percent by weight, based upon the total monomers, of a compound having a formula selected from the group consisting of:

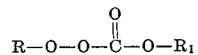

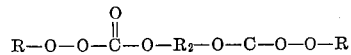

and

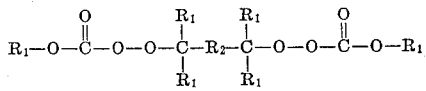

where R is selected from the group consisting of tertiary-alkyl radicals of up to about 8 carbon atoms and aryl substituted derivatives thereof; $R_1$ is selected from the group consisting of alkyl radicals of up to about 8 carbon atoms, aryl radicals, aralkyl radicals and alkoxyalkyl radicals; and $R_2$ is selected from the group consisting of alkylene radicals of up to about 12 carbon atoms and oxaalkylene radicals of up to about 10 carbon atoms.

16. The improvement of claim 15 in which the amount of said compound is from about 0.2 percent to about 0.6 percent by weight based upon the total monomers.

17. The improvement of claim 15 in which said hydroxyalkyl ester is a hydroxyalkyl methacrylate.

18. The improvement of claim 17 in which said hydroxyalkyl methacrylate is a mixture of hydroxyethyl methacrylate and hydroxypropyl methacrylate.

19. The improvement of claim 15 in which said mixture of monomers comprises at least about 50 percent by weight of alkyl acrylate.

20. The improvement of claim 15 in which said mixture of monomers comprises acrylonitrile or methacrylonitrile.

21. The improvement of claim 15 in which said mixture of monomers comprises styrene.

No references cited.

JOSEPH L. SCHOFER, *Primary Examiner.*

JAMES A. SEIDLECK, *Assistant Examiner.*